United States Patent
Keller et al.

(10) Patent No.: US 8,866,418 B2
(45) Date of Patent: Oct. 21, 2014

(54) DUAL PINION DRIVE SYSTEM

(71) Applicant: ABB Research Ltd, Zürich (CH)

(72) Inventors: Robert Keller, Baden-Dättwil (CH); Mehmet Mercangoez, Baden-Dättwil (CH); Georgios Papafotiou, Adliswil (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 13/764,101

(22) Filed: Feb. 11, 2013

(65) Prior Publication Data
US 2013/0157805 A1 Jun. 20, 2013

Related U.S. Application Data

(63) Continuation of application No. PCT/EP2011/063722, filed on Aug. 9, 2011.

(30) Foreign Application Priority Data

Aug. 10, 2010 (EP) ............................. 10172375

(51) Int. Cl.
*H02P 5/00* (2006.01)
(Continued)

(52) U.S. Cl.
CPC *G05D 17/02* (2013.01); *G05B 5/01* (2013.01); *H02P 5/503* (2013.01); *H02P 5/50* (2013.01); *H02P 5/46* (2013.01); *G05B 2219/41166* (2013.01)
USPC ............... 318/34; 318/69; 318/286; 318/434; 318/466

(58) Field of Classification Search
CPC ......... H02P 5/74; H02P 5/483; H02H 7/0851; Y02T 10/646; Y02T 10/70
USPC ............................. 318/34, 69, 286, 434, 466
See application file for complete search history.

(56) References Cited

U.S. PATENT DOCUMENTS

| | | | | |
|---|---|---|---|---|
| 6,086,242 A | * | 7/2000 | Rajamani et al. | 366/217 |
| 7,569,999 B2 | * | 8/2009 | Hayashi | 318/34 |

(Continued)

FOREIGN PATENT DOCUMENTS

| | | |
|---|---|---|
| EP | 1742128 A1 | 1/2007 |
| EP | 1892824 A2 | 2/2008 |

(Continued)

OTHER PUBLICATIONS

International Search Report (PCT/ISA/210) issued on Jan. 30, 2012, by the European Patent Office as the International Searching Authority for International Application No. PCT/EP2011/063722.

(Continued)

*Primary Examiner* — Eduardo Colon Santana
*Assistant Examiner* — Gabriel Agared
(74) *Attorney, Agent, or Firm* — Buchanan Ingersoll & Rooney PC

(57) ABSTRACT

A system and method are disclosed for controlling electrical machines including a controller component which receives a first signal providing a measured parameter of the electrical machine and a second signal providing a reference parameter of the electrical machine, using the first and second signals being used to produce a first control signal. A first filter component receives the first signal from the electrical machine and uses the first signal to produce a second control signal. A second filter component receives a third signal which relates to a reference parameter of a second electrical machine and uses the third signal to produce a third control signal. The system and second control signals are used to produce a first output control signal for provision to the first electrical machine, and the first and third control signals are used produce a second output control signal for provision to the second electrical machine.

19 Claims, 4 Drawing Sheets

(51) Int. Cl.

| | | |
|---|---|---|
| *H02P 5/46* | (2006.01) | |
| *H02P 7/00* | (2006.01) | |
| *H02P 3/00* | (2006.01) | |
| *G05B 5/01* | (2006.01) | |
| *G05D 17/02* | (2006.01) | |
| *H02P 5/50* | (2006.01) | |

(56) References Cited

U.S. PATENT DOCUMENTS

| | | | |
|---|---|---|---|
| 2004/0055185 A1* | 3/2004 | Onsager et al. | 37/307 |
| 2006/0060684 A1* | 3/2006 | Morrow et al. | 241/30 |
| 2007/0007926 A1 | 1/2007 | Iwashita et al. | |
| 2008/0048592 A1 | 2/2008 | Hayashi | |
| 2009/0251740 A1* | 10/2009 | Winteraeken et al. | 358/474 |
| 2010/0251946 A1* | 10/2010 | Borissov et al. | 110/342 |

FOREIGN PATENT DOCUMENTS

| | | |
|---|---|---|
| JP | 9-149669 A | 6/1997 |
| JP | 2009-42985 A | 2/2009 |
| JP | 2009-208206 A | 9/2009 |

OTHER PUBLICATIONS

Written Opinion (PCT/ISA/237) issued on Jan. 30, 2012, by the Japanese Patent Office as the International Searching Authority for International Application No. PCT/EP2011/063722.

European Search Report issued Apr. 27, 2011 for European Application No. 10172375.7.

Notification Concerning Transmittal of International Preliminary Report on Patentability (Forms PCT/IB/326 and PCT/IB/373) and the Written Opinion of the International Searching Authority (Form PCT/ISA/237) dated Feb. 21, 2013, issued in corresponding International Application No. PCT/EP2011/063722. (11 pages).

* cited by examiner

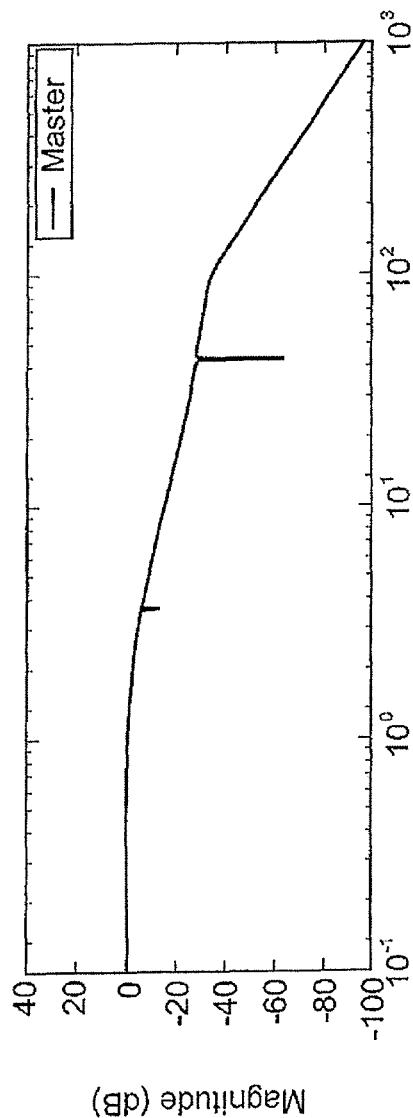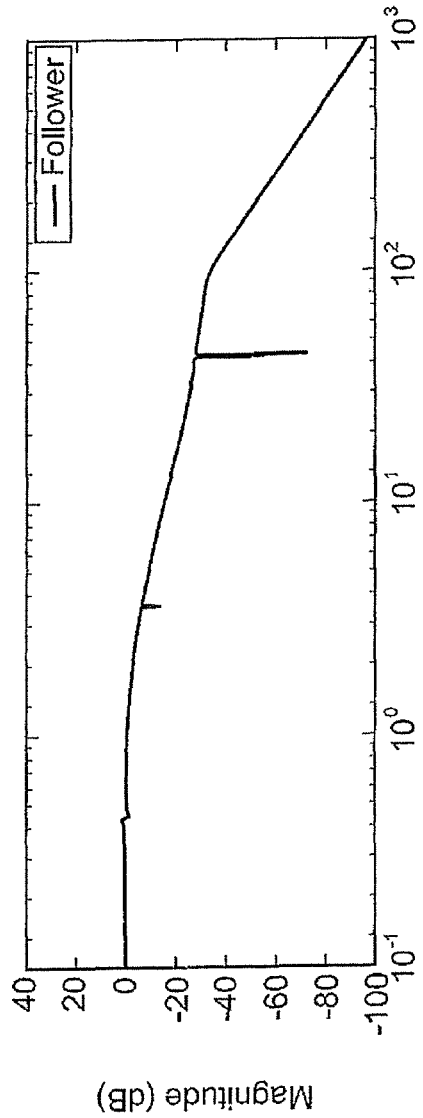

US 8,866,418 B2

DUAL PINION DRIVE SYSTEM

RELATED APPLICATION(S)

This application claims priority as a continuation application under 35 U.S.C. §120 to PCT/EP2011/063722, which was filed as an International Application on Aug. 9, 2011, designating the U.S., and which claims priority to European Application No. 10172375.7 filed on Aug. 10, 2010. The entire contents of these applications are hereby incorporated by reference in their entireties.

FIELD

The present disclosure relates to a dual pinion drive system and an associated method of control and to feed forward oscillation damping in a dual pinion variable speed drive system.

BACKGROUND INFORMATION

Dual pinion variable speed drive systems are known to be used in cement mills where two variable speed drives are connected to the same cement mill. An example of such a system 2 is shown in FIG. 1 and comprises a first motor 11a, a second motor 11b, corresponding drive convertors 15a and 15b, and a cement mill 16.

The components of such a system feature a number of physical properties such as inertia, stiffness and damping and during its operation there is interplay of these properties between each component within the system. An illustration of the interplay of mechanical properties between the components is shown in FIG. 2. Motor components 11a, b act upon load component, in this case a cement mill, 16 via coupling in components 12a, b and coupling out components 14a, b. Each of the components 11a, 11b, 12a, 12b, 14a, 14b and 16 represents an inertia within the system. Torque 10a, 10b is input into drives 11a, 11b respectively and between each of the motors 11a and coupling in component 12a, coupling in component 12a and coupling out component 14a, coupling out component 14a and load 16 there is acting a mechanical stiffness 13a and mechanical damping 13b. Output from the load is the load torque 18a as well as mechanical damping 13b.

As a result of the interplay of these mechanical properties within the system, a dual pinion drive system having variable speed drives can be prone to issues caused by torsional oscillations. If the system is considered as a three mass system, namely motors 11a, 11b and load 16, the dual pinion drive system can exhibit two natural modes of low frequency oscillation. In the first mode, motors 11a and 11b oscillate in counter phase wherein motor 11a speeds up whilst motor 11b slows down and vice versa. For example, motors 11a and 11b alternately pull the load, which maintains a constant speed. The natural frequency of systems, having soft couplings, operating in this mode has been observed to be about 1 Hz to 5 Hz. In the second mode, motors 11a and 11b oscillate in phase with each other but counter to the load 18. The natural frequency of a system operating in this mode has been observed to be about 3 Hz to 8 Hz, which can be higher than the natural frequency of the first mode.

In view of the variation in the natural oscillation frequency of systems operating in the first mode or the second mode, the frequency response aspect of their design takes into account the inclusion of controls capable of damping both of the modes of natural oscillation.

The frequency response of such a known dual pinion drive system, when used for example in a Semi Autogenous Grinding Mill, is shown in FIG. 3. The graph, line A in the graph illustrates the comparison of the torque reference of the first motor 11a to the rotational speed of the motor 11a and this shows the counter-phase and in-phase oscillations of the frequency response. Also provided for the sake of comparison is the frequency response in a single pinion configuration, shown by line B. As shown in from Line A, in addition to the natural modes of oscillation for a three mass system, a high frequency mode can also be seen around 240 Hz. This high frequency mode can be as a result of a flexible coupling in the drive train model. The illustration in the graph primarily shows that a source of oscillations in the torque reference in the drive train has the potential risk of being amplified at three different frequencies. Therefore, it may be important that the control system is suitably assessed to establish the effectiveness in damping these oscillations.

In a dual pinion variable speed drive system such as that of FIG. 1, the motors 11a, 11b are controlled using a master-follower configuration wherein one of the motors, 11a, is the master drive and is responsible for speed control of the system by virtue of providing input into a common Proportional Integral (PI) speed controller meaning motor 11b is the follower drive. The rotational speed of the master drive is input into the PI speed controller where it is compared against a predetermined set-point to calculate a torque reference signal. From this, a torque command is generated by the PI speed controller and is sent to both the master drive converter 15a and the second drive converter 15b. The converters 15a and 15b using their existing internal control system (not shown), can then produce the necessary voltage waveforms to drive their respective motors 11a, 11b according to the generated torque commands. An illustration of this process is show in FIG. 4.

Regardless of the PI speed controller tuning parameters, the counter phase oscillations are not damped and thus can pose a potential risk to the system. FIG. 5 shows the frequency response of the motor speed of the follower drive as influenced by the speed reference changes in the master drive motor. The nominal setpoint tracking performance from the control system can cause significant oscillations in the motor speed of the follower drive and thus the torque load sustained by the shafts interconnecting the components of the system.

Detuning the control settings of the PI speed controller reduces the magnitude of the oscillations, however as a result of the detuning the control performance degrades beyond acceptable limits for the system.

Another approach to overcome these issues has involved carrying out extensive low-pass filtering of the feedback signals. The low pass filtering can damp the oscillations within the system, however it can slow the overall closed-loop dynamics of the system.

SUMMARY

A control system is disclosed for controlling a mechanical system having first and second electrical machines, the control system comprising: a controller component operable to receive a first signal which relates to a measured parameter of a first electrical machine and a second signal which relates to a reference parameter of the first electrical machine, the controller component being operable to use the first signal and the second signal to produce a first control signal; a first filter component operable to receive the first signal from the first electrical machine and to use the first signal to produce a second control signal; a second filter component operable to receive a third signal which relates to a reference parameter of a second electrical machine and to use the third signal to produce a third control signal; a first output component operable to receive the first control signal and the second control signal and to combine the first and second control signals to produce a first output control signal for provision to the first electrical machine; and a second output component operable to receive the first control signal and the third control signal and to combine the first and third control signals to produce a second output control signal for provision to the second electrical machine.

A method is disclosed for controlling a mechanical system having first and second electrical machines, the method comprising: receiving a first signal relating to a measured parameter of the first electrical machine; receiving a second signal relating to a first reference parameter of the first electrical machine; receiving a third signal relating to a measured parameter of a second electrical machine; producing a first control signal from the first and second signals using a controller component; producing a second control signal from the first signal using a first filter component; producing a third control signal from the third signal using a second filter component; producing a first output control signal from the first and the second control signals using a first output component; producing a second output control signal from the first and third control signals using a second output component; supplying the first output control signal to the first electrical machine; and supplying the second output control signal to the second electrical machine.

A method is disclosed of controlling a mechanical system which includes first and second electric motors that are mechanically coupled to one another, the method comprising: supplying control signals to first and second electric motors using speed feedback and a self-tuned adaptive feedforward filter.

BRIEF DESCRIPTION OF THE DRAWINGS

These and other aspects of the disclosure will become apparent from the following description when taken in combination with the accompanying drawings in which:

FIG. 7A shows a graphical representation of the frequency response of a master motor of an electrical machine being controlled by the control system of FIG. 6; and FIG. 7B shows a graphical representation of the frequency response of a follower motor of an electrical machine being controlled by the control system of FIG. 6.

DETAILED DESCRIPTION

Figure 1:
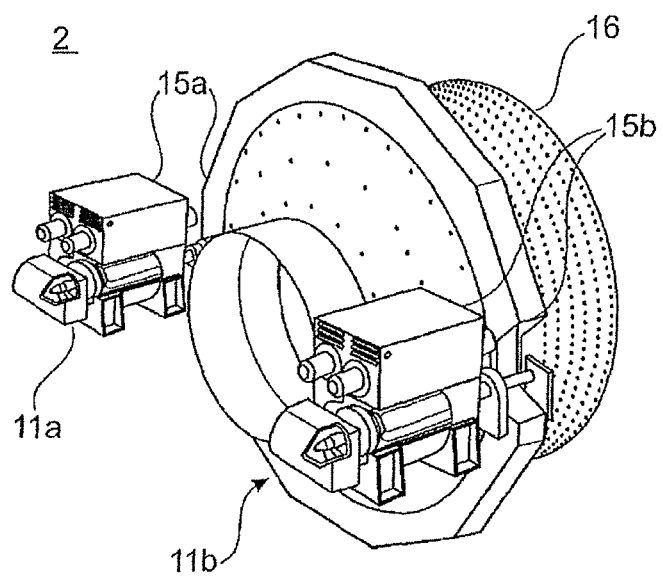
FIG. 1 shows an exemplary cement mill dual pinion drive system.
Figure 2:
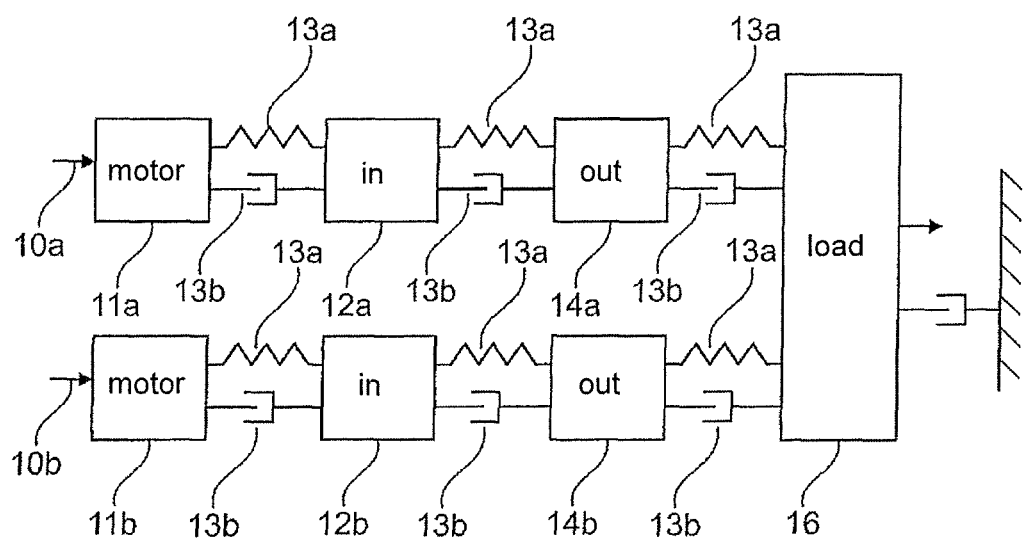
FIG. 2 shows a schematic diagram of the interplay of mechanical properties of the components of a system as shown in FIG. 1.
Figure 3:
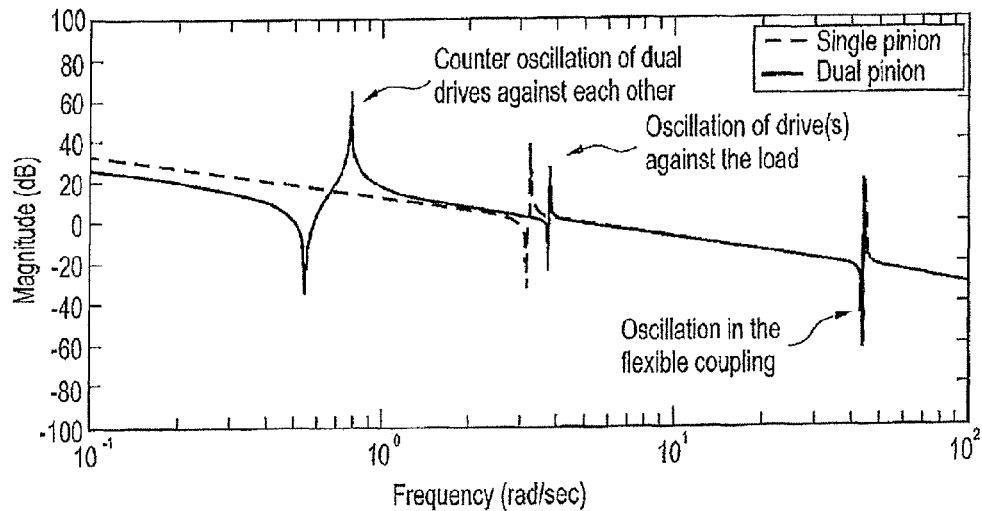
FIG. 3 shows a graphical representation of the frequency response of a known dual pinion drive system compared to the frequency response of a single pinion drive system.
Figure 4:
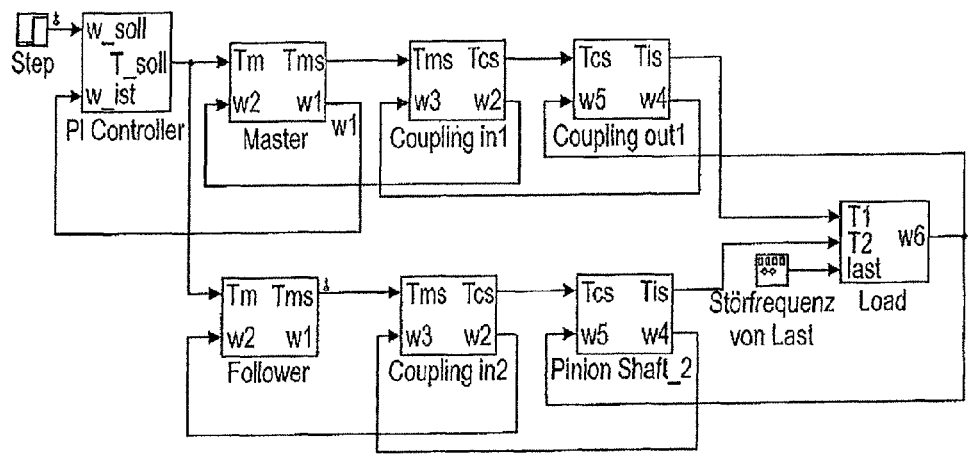
FIG. 4 shows a schematic diagram of a known control process for a master-follower type dual pinion drive system.
Figure 5:
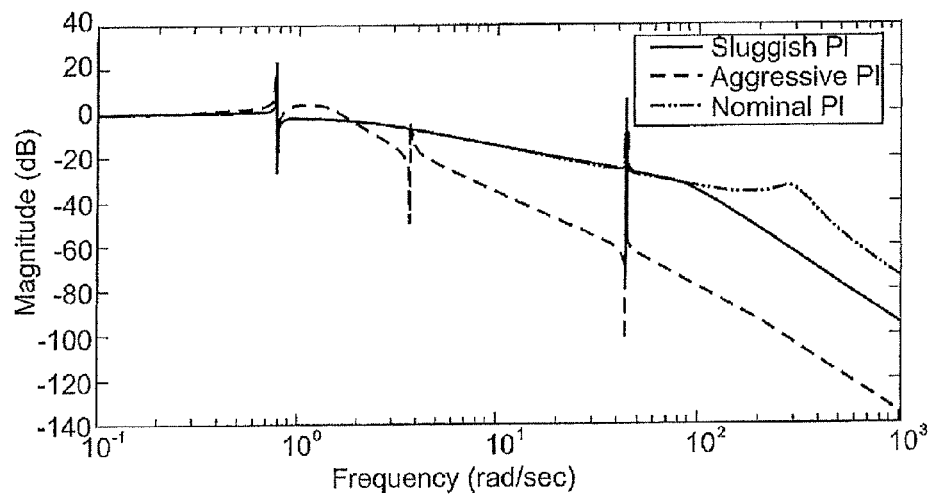
FIG. 5 shows a graphical representation of the frequency response of the rotational speed of the follower motor of the system of FIG. 4.

According to an exemplary embodiment of the present disclosure, a control system is disclosed having first and second electrical machines, the control system comprising a controller component operable to receive a first signal which relates to a measured parameter of a first electrical machine and a second signal which relates to a reference parameter of such a first electrical machine, the controller component being operable to use the first signal and second signal to produce a first control signal; a first filter component which is operable to receive such a first signal from such a first electrical machine and to use a received first signal to produce a second control signal; a first output component which is operable to receive such a first control signal and such a second control signal and to combine said first and second control signals to produce a first output control signal for provision to said first electrical machine, the control system further comprises a second filter component operable to receive a third signal which relates to a measured parameter of a second electrical machine from that second electrical machine and to use the third signal to produce a third control signal; and a second output component operable to receive such a first control signal and such a third control signal and to combine such first and third control signals to produce a second output control signal for provision to a second electrical machine.

According to another exemplary embodiment, the first output control signal is provided to a first converter component operable to drive said first electrical machine and the second output control signal is provided to a second converter component operable to drive said second electrical machine.

The arrangement of the control component and first filter component and second filter component in this control system can act to remove peaks in an aspect of the first measured parameter which forms the first signal when the control system is implemented with a converter component operable to drive first and second electrical machines and can remove peaks in an aspect of the second measured parameter which forms the third signal when the control system is implemented with a converter component operable to drive the second electrical machine.

According to another exemplary embodiment, the control component is a proportional integral controller, each filter component may be a band pass filter and each converter component may be a power electronics converter component.

The first signal may comprise the measured rotational speed of the first electrical machine, the second signal may comprise a reference rotational speed of the first machine and the third signal may comprise a measured rotational speed of the second electrical machine.

According to a further exemplary embodiment, each output control signal can be a torque command.

The first and second electrical machines may be mechanically coupled to a load and by way of this the first and second electrical machines can be considered to be mechanically coupled to one another. Each mechanical coupling may be a flexible coupling.

It will be understood that the term flexible coupling, also commonly known as elastic coupling, refers to a mechanical coupling arrangement such as one which transmits torque from a motor to a load which it is driving whilst allowing misalignments between shafts of the motor and load, as well as removing resonances and dampening vibrations. For example, such flexible coupling can result in a length operational lifetime for the machinery it couples and often also provides the benefit of minimizing maintenance specifications.

The control system may comprise more than two electrical machines and for example may comprise n electrical machines, where n can be a whole number of 2 or more.

In such a control system, a $(n+1)^{th}$ filter component operable to receive a $(n+1)^{th}$ signal which relates to a measured parameter of a $n^{th}$ electrical machine from that $n^{th}$ electrical machine and to use the $(n+1)^{th}$ signal to produce a $(n+1)^{th}$ control signal; and a $n^{th}$ output component operable to receive the first control signal and the $(n+1)^{th}$ control signal and to combine the first and $(n+1)^{th}$ control signals to produce a $n^{th}$ output control signal for provision to a $n^{th}$ electrical machine.

According to another exemplary embodiment of the disclosure, a method for controlling a mechanical system having first and second electrical machines is disclosed, the method comprising receiving a first signal relating to a first measured parameter of the first electrical machine, receiving a second signal relating to a first reference parameter of the first electrical machine, producing a first control signal from the first and second signals using a controller component, producing a second control signal from the first signal using a filter component, producing an first output control signal from the first and second control signals using a first output component, supplying the first output control signal to the first electrical machine, and receiving a third signal relating to a second measured parameter of a second electrical machine; producing a third control signal from the third signal using a filter component; producing a second output control signal from the first and third control signals using a second output component, and supplying the second output control signal to the second electrical machine.

By producing a first output control signal from the first control signal and second control signal, and a second output control signal from the first control signal and third control signal, peaks in an aspect of the first measured parameter can be removed, and peaks in an aspect of the second measured parameter can be removed when the control system is implemented with a converter component operably driving an electrical machine.

In accordance with an exemplary embodiment of this method, the first and second electrical machine may each be mechanically coupled to a load and by way of this may each be mechanically coupled to one another via the load. Each mechanical coupling may be a flexible coupling.

According to another exemplary embodiment of the disclosure, a controller for controlling a mechanical system is disclosed, which includes first and second electric motors that are mechanically coupled to one another, the controller being operable to supply control signals to first and second electric motors using speed feedback and a self-tuned adaptive feedforward filter. Each mechanical coupling may be a flexible coupling.

According to a further exemplary embodiment of the disclosure, a method of controlling a mechanical system is disclosed, which includes first and second electric motors that are mechanically coupled to one another, the method including supplying control signals to first and second electric motors using speed feedback and a self-tuned adaptive feedforward filter technique. Each mechanical coupling may be a flexible coupling.

Figure 6:
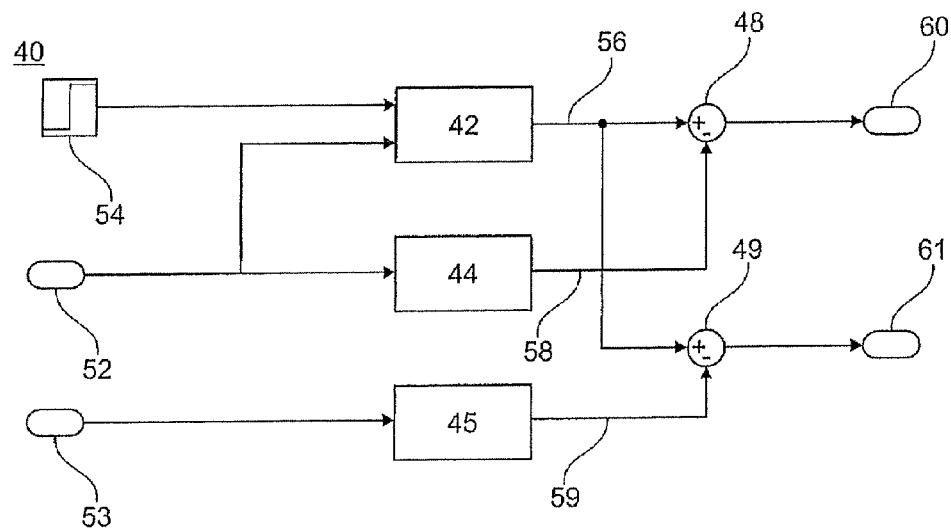
FIG. 6 shows a control system for an electrical machine according to a second embodiment of the present disclosure.

In FIG. 6 there is shown a control system 40 for use with a dual pinion drive system such as a dual pinion drive cement mill. For the purposes of the description, a master-follower type dual pinion drive system such as the cement mill of FIG. 1 will be referred to. The control system 40 can act upon both the master motor 11a and the follower motor 11b of the dual pinion drive system 2.

In order to counteract oscillations in the dual pinion drive system 2 in a further exemplary embodiment, the control system 40 can be provided with a PI controller 42 arranged in parallel to a master band pass filter 44 and a follower band pass filter 45. The control system 40 can further be provided with a master output calculator 48 and a follower output calculator 49.

At any given moment in the operation of the control system 40, a measurement of rotational speed 52 of the master motor (11a of FIG. 1) can be provided to both the PI controller 42 and the master band pass filter 44. A reference value 54 for the rotational speed can also be provided to the PI controller. A measurement of rotational speed 53 of the follower motor (11b of FIG. 1) can be provided to the follower band pass filter 45. The PI controller can use reference value 54 and first measurement 52 to generate a first output signal 56. The master band pass filter can use the first measurement 52 to generate a second output signal 58. The follower band pass filter can use the second measurement 53 to generate a third output signal 59. In this case the function of the master band pass filter 44 can be the same as that of the follower band pass filter 45, namely:

$$y = K_d \left( \frac{\frac{1}{(a2\Pi f_0)}s}{\frac{1}{(a2\Pi f_0)}s + 1} \right) \left( \frac{1}{\frac{1}{(b2\Pi f_0)}s + 1} \right) u$$

where $K_d$ is the filter gain and $f_0$ is the frequency of the oscillations to be damped. The simple tuning parameters a and b can be used to further tune the filter properties. The first output signal 56 and second output signal 58 can then be provided to the master output calculator 48 which can use the supplied information to generate an output master torque command 60 which in turn can be supplied to the master motor 11a via the power electronics control converter 12a. The first output signal 56 and the third output signal 59 can be provided to the follower output calculator 49 which can use the supplied information to generate an output follower torque command 61 which can then be supplied to the follower motor 11b via the power electronics control converter 12b.

As the control system 40 is operating in discrete time this can be an iterative process repeated with the sampling time of the control algorithm which, for example, in the case of torsional oscillations, can be around 1 ms. The power electronics converter control system (not shown), can be responsible for actually driving the cement mill such that the desired torque is produced, has a sampling time of probably 25 μs.

The operation of the control system 40 can result in a swing damping effect upon the frequency response of the master motor speed, which in effect can remove the peaks in the master motor, 11a, speed frequency response as well as a swing damping effect upon the frequency response of the follower motor speed which similarly can remove the peaks in the follower motor speed frequency response. A graphical representation of this effect is illustrated in FIGS. 7A and 7B respectively.

In the control system 40, the main torque command for the system can be still output from the master output calculator 48. However, the additional feedback loop for the follower motor can act to enhance oscillation suppression within the system 2 by enabling the control system to dampen the natural mode of oscillation in the rotation speeds of both the master and follower drive in the dual pinion drive system.

The control system of FIG. 6 can provide a feed forward oscillation damping control method which acts upon the torque commands provided to each of the motors in a dual pinion drive system thus reducing unwanted torsional oscillations along the shafts of the motors which connects the motors to the load being driven, for example the cement mill of FIG. 1. Furthermore the detailed control systems can reduce the torsional oscillations acting on the load.

In the arrangement detailed in FIG. 6, the control system can be implemented on any board suitable for use with Medium Voltage (MV) drive systems. Alternatively, a Low Voltage drive control platform in a relevant application may be used.

It will be understood that in the arrangement detailed in FIG. 6 with respect to FIG. 1, that master and follower motors 11a and 11b are mechanically coupled to one another via the mechanical load which they drive, for example, in this case, a cement mill 16. In such an arrangement, the mechanical coupling can be a flexible coupling, also commonly known as elastic coupling. A flexible coupling transmits the torque from the motor 11a or 11b to the load 16 which it is driving whilst allowing misalignments between shafts of the motor and load, as well as removing resonances and dampening vibrations. For example, such flexible coupling results in a length operational lifetime for the machinery it couples and often can provide the benefit of minimizing maintenance requirements.

It will be further appreciated that the control system may comprise more than two motors and for example may comprise n motors, where n is a whole number of 2 or more. In a control system comprising n motors, a $(n+1)^{th}$ filter component operable to receive a $(n+1)^{th}$ signal which relates to a measured parameter of a $n^{th}$ motor from that $n^{th}$ motor and to use the $(n+1)^{th}$ signal to produce a $(n+1)^{th}$ control signal; and a $n^{th}$ output component operable to receive the first control signal and the $(n+1)^{th}$ control signal and to combine the first and $(n+1)^{th}$ control signals to produce a $n^{th}$ output control signal for provision to a $n^{th}$ motor.

Various modifications may be made to the embodiments hereinbefore described without departing from the scope of the disclosure. For example, although the control system embodiments have been described with reference to a dual pinion drive cement mill any equipment having a dual pinion drive would benefit from the advantages of the control system. In addition, it will be appreciated that whilst the embodiments above have been detailed as having flexible mechanical coupling between the motors and the respective loads which they are driving, other mechanical coupling arrangements could be used.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A control system for controlling a mechanical system having first and second electrical machines, the control system comprising:
    a controller component, a first output component, a second output component, a first filter component, and a second filter component;
    wherein the controller component is operable to receive a first signal which relates to a measured parameter of a first electrical machine and a second signal which relates to a reference parameter of the first electrical machine, the controller component being operable to use the first signal and the second signal to produce a first control signal;
    the first filter component is operable to receive the first signal from the first electrical machine and to use the first signal to produce a second control signal;
    the second filter component is operable to receive a third signal which relates to a measured parameter of a second electrical machine and to use the third signal to produce a third control signal;
    the first output component is operable to receive the first control signal and the second control signal and to combine the first and second control signals to produce a first output control signal for provision to the first electrical machine; and
    the second output component is operable to receive the first control signal and the third control signal and to combine the first and third control signals to produce a second output control signal for provision to the second electrical machine.

2. A control system as claimed in claim 1, wherein the first signal comprises a measured rotational speed of the first electrical machine, the second electrical signal comprises a reference rotational speed of the first electrical machine, and the third signal comprises a measured rotational speed of the second electrical machine.

3. A control system as claimed in claim 1, wherein the third signal comprises a reference rotational speed.

4. A control system as claimed in claim 1, in combination with first and second electrical machines, each mechanically coupled to a load.

5. A control system as claimed in claim 4, wherein each mechanical coupling is a flexible coupling.

6. A control system as claimed in claim 1, in combination with first and the second electrical machines which each act upon a load, and wherein the first and the second electrical machines are mechanically coupled to one another via the load.

7. A control system as claimed in claim 6, wherein each mechanical coupling is a flexible coupling.

8. A control system as claimed in claim 1, wherein the third signal comprises a reference rotational speed.

9. A control system as claimed in claim 1, wherein a combination of the first and second control signals in the first output component to produce a first output control signal comprises the subtraction of the second control signal from the first control signal.

10. A control system as claimed in claim 1, wherein the first filter component and the second filter component each comprise a band pass filter.

11. A control system as claimed in claim 1, wherein a filter functions of the first filter component and the second filter component comprise a natural frequency of the mechanical system.

12. A control system as claimed in claim 11, wherein the filter functions of the first filter component and the second filter component comprise a first natural frequency of the mechanical system.

13. A control system as claimed in claim 11, wherein the filter functions of the first filter component and the second filter component comprise $$K_d \left( \frac{\frac{1}{(a2\Pi f_0)}s}{\frac{1}{(a2\Pi f_0)}s+1} \right) \left( \frac{1}{\frac{1}{(b2\Pi f_0)}s+1} \right).$$

14. A control system as claimed in claim 1, wherein the mechanical system comprises a dual pinion drive system.

15. A control system as claimed in claim 1, wherein the mechanical system comprises a dual pinion drive cement mill.

16. A control system as claimed in claim 1, wherein the controller component comprises a PI controller.

17. A method for controlling a mechanical system having first and second electrical machines, the method comprising:
   receiving a first signal relating to a measured rotational speed of the first electrical machine;
   receiving a second signal relating to a first reference rotational speed of the first electrical machine;
   receiving a third signal relating to a measured rotational speed of a second electrical machine;
   producing a first control signal from the first and second signals using a controller component;
   producing a second control signal from the first signal using a first filter component;
   producing a third control signal from the third signal using a second filter component;
   producing a first output control signal from the first and the second control signals using a first output component;
   producing a second output control signal from the first and third control signals using a second output component;
   supplying the first output control signal to the first electrical machine; and
   supplying the second output control signal to the second electrical machine.

18. A method as claimed in claim 17, comprising:
   mechanically coupling each of the first and second electrical machines to a load.

19. A method as claimed in claim 17, comprising:
   mechanically coupling the first and second electrical machines to one another via a load, and wherein the first and the second electrical machines each act upon the load.

\* \* \* \* \*